(12) United States Patent
Johnston et al.

(10) Patent No.: US 8,700,655 B2
(45) Date of Patent: Apr. 15, 2014

(54) SYSTEMS, METHODS, AND COMPUTER PROGRAM PRODUCTS FOR LOCATION SALIENCE MODELING FOR MULTIMODAL SEARCH

(75) Inventors: Michael Johnston, New York, NY (US); Patrick Ehlen, San Francisco, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 258 days.

(21) Appl. No.: 12/941,312

(22) Filed: Nov. 8, 2010

(65) Prior Publication Data

US 2012/0117112 A1     May 10, 2012

(51) Int. Cl.
 *G06F 7/00*     (2006.01)
 *G06F 17/30*    (2006.01)

(52) U.S. Cl.
 USPC ........................................ 707/769; 707/718

(58) Field of Classification Search
 USPC ......... 707/706, 771, 918, 713, 718, 728, 731, 707/758, 769, 999.003
 See application file for complete search history.

(56) References Cited

U.S. PATENT DOCUMENTS

| | | | |
|---|---|---|---|
| 2006/0184625 A1* | 8/2006 | Nordvik et al. | 709/204 |
| 2008/0154612 A1* | 6/2008 | Evermann et al. | 704/275 |
| 2010/0123737 A1* | 5/2010 | Williamson et al. | 345/672 |

OTHER PUBLICATIONS

Author: Johnston et al.; Title: MATCH: An Architecture for Multimodal Dialogue Systems; Date: Jul. 2002; pp. 1-8.*
Autors: Patrick Ehlen and Michael Johnston; Title: Location Grounding in Multimodal Local Search; Copyright 2010 ACM; pp. 1-8.*

* cited by examiner

*Primary Examiner* — MD. I Uddin
(74) *Attorney, Agent, or Firm* — Parks IP Law LLC; Mickki D. Murray, Esq.

(57) ABSTRACT

Computational models of dialog context have often focused on unimodal spoken dialog or text, using the language itself as the primary locus of contextual information. But as spoken unimodal interaction is replaced by situated multimodal interaction on mobile platforms supporting a combination of spoken dialog with graphical interaction, touch-screen input, geolocation, and other non-linguistic contextual factors, a need arises for more sophisticated models of context that capture the influence of these factors on semantic interpretation and dialog flow. The systems, methods, and computer program products disclosed herein address this need. A method for multimodal search includes, in part, determining an intended location of search query based upon information received from a remote mobile device that issued the search query.

11 Claims, 10 Drawing Sheets

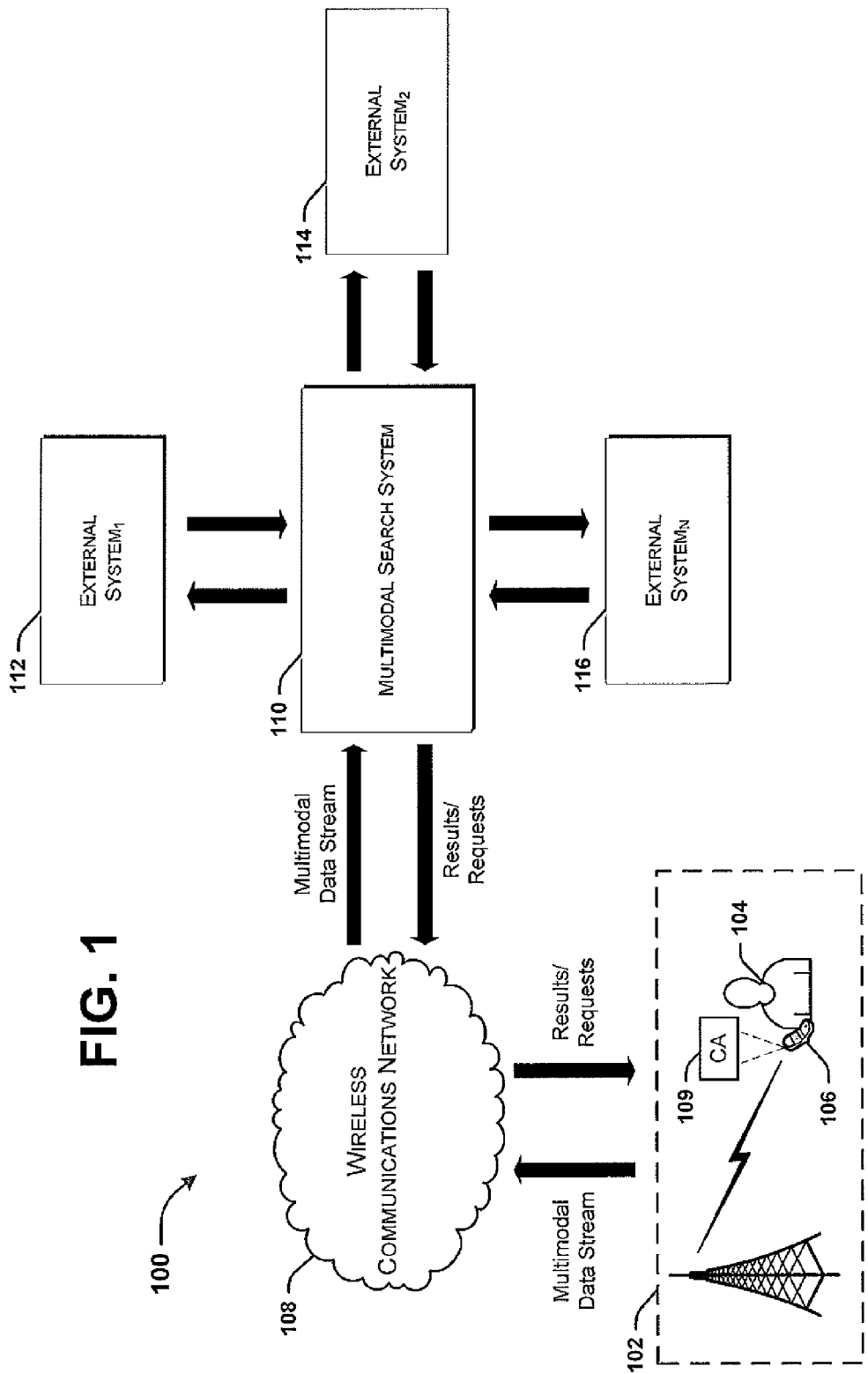

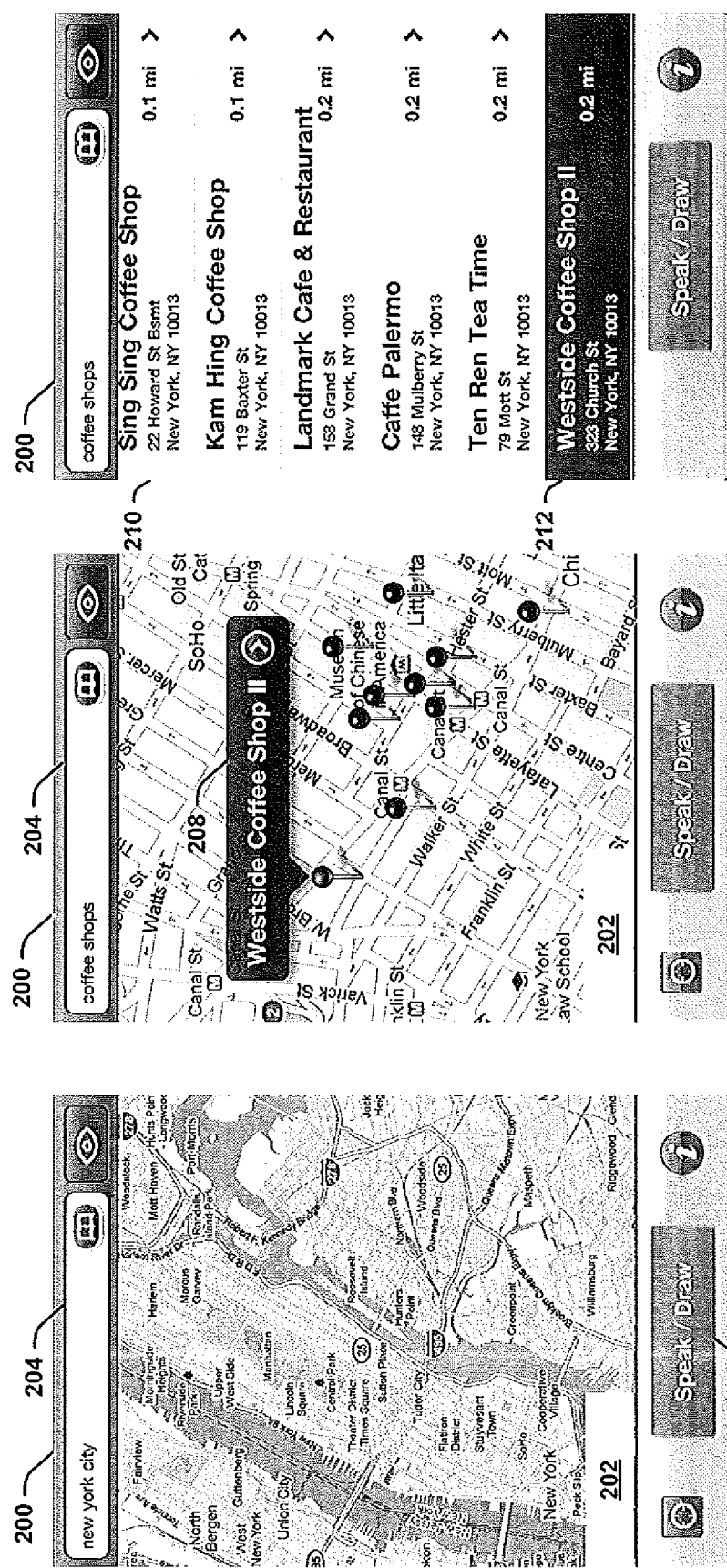

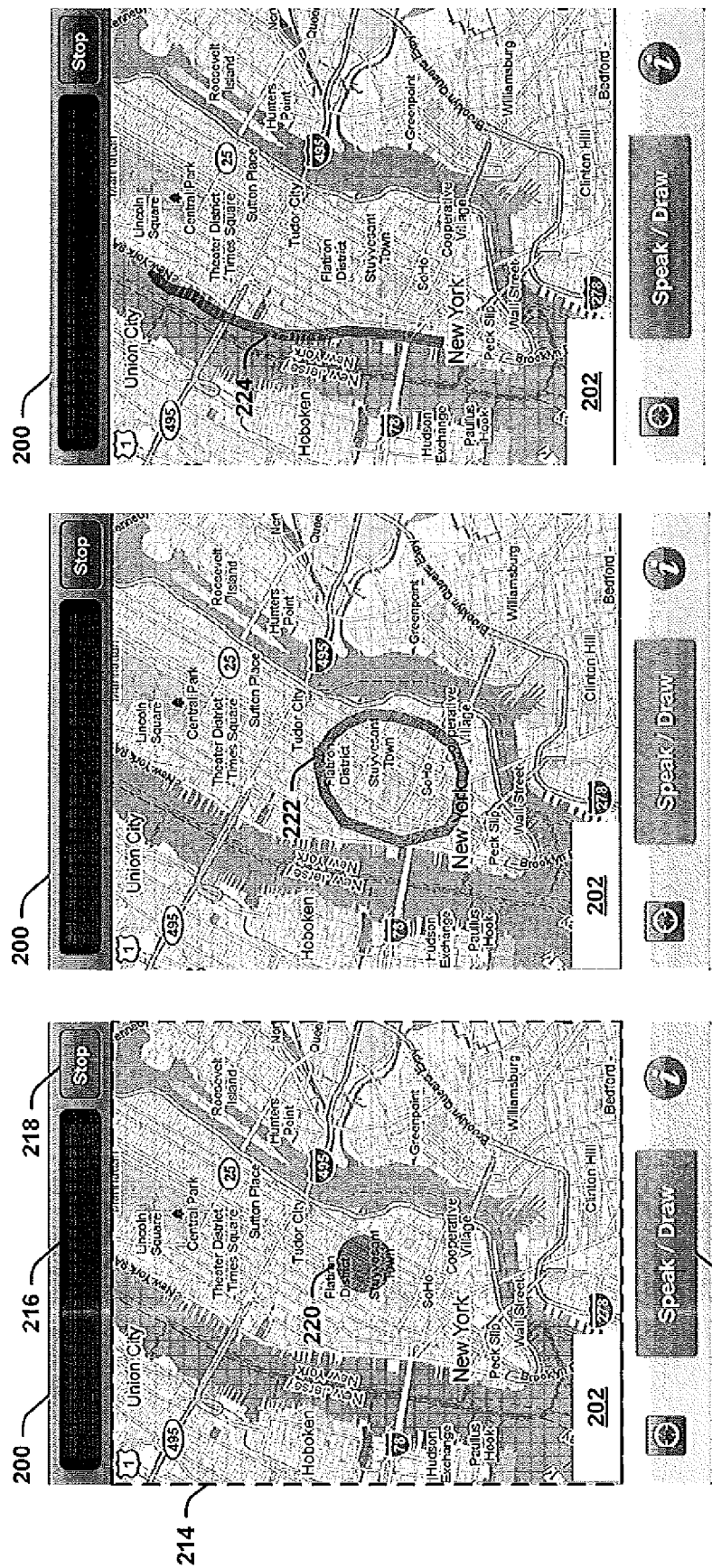

SYSTEMS, METHODS, AND COMPUTER PROGRAM PRODUCTS FOR LOCATION SALIENCE MODELING FOR MULTIMODAL SEARCH

TECHNICAL FIELD

The embodiments presented herein relate generally to search technologies and, more particularly, to systems, methods, and computer program products for location salience modeling for multimodal search.

BACKGROUND

In recent years, the capabilities of mobile devices and the data networks supporting them have advanced to the point where it is possible to offer multimodal search capabilities to mobile consumers. For example, applications such as Speak4it® (Speak4it is a registered trademark of AT&T Intellectual Property, Inc., of Reno, Nev.) allow people to find businesses by using spoken queries, and then browse the results on a graphical user interface (GUI).

An important feature of the Speak4it application, and applications with similar local search functionality, such as Google® Mobile (Google is a registered trademark of Google Inc., of Mountain View, Calif.) and Vlingo® (Vlingo is a registered trademark of Vlingo Corporation, of Cambridge, Mass.), is the ability to use global positioning system (GPS), cell tower triangulation, Wi-Fi™ triangulation, and/or other location determining techniques to ascertain the approximate location of a device in order to constrain the results returned so they are relevant to the user's presumed local context. When a user says "gas stations," the system will return a map showing gas stations in the immediate vicinity of the location of the device. This strategy allows users to conduct searches even when they do not know the name or pronunciation of the town they are in and, like other kinds of multimodal input, is likely to reduce the complexity of their queries, thereby simplifying recognition processes and user understanding.

However, as interactive multimodal dialog capabilities are added to search applications such as Speak4it and a broader set of use cases is considered, the "brute force" approach of assuming that the most salient (i.e., most relevant, important, or significant) location for the user is always the current physical location of the device may not be sufficient. If the device has a touch screen and the search application provides the user with a map, the salient location may be a location the user has explicitly touched. If the map is pan-able, through touch (e.g., point, multi-point, and/or gesture), on-screen software controls (e.g., directional pad, joystick, soft buttons, etc.), or hardware interface component (e.g., keypads, scroll wheels, scroll balls, dedicated hardware buttons, etc.), the most salient location may be the last location to which the user panned. Alternatively, if the user is able to refer to locations by voice, for example, "Show the Empire State Building" or "Chinese restaurants on the Upper West Side," then the relevant location referent may have been introduced as part of that spoken dialog. That is, by interacting with the system the user may have established a series of actions aimed at grounding some location. Thus, the user would likely consider that grounded location as being most salient and as the location reference to be inferred when the location in which a search is to be conducted is otherwise left ambiguous or unspecified.

As an example of this grounding problem, suppose a user is interacting with a GPS-enabled mobile device in Manhattan and is currently located in the Lower East Side but browsing a search application to find a That restaurant near Central Park, the user says, "Show Central Park," and then scrolls and zooms-in on the map to view a four-block square area on the Upper West Side next to Central Park. If the user then says, "That restaurants," most people would understand that this user seeks information about That restaurants in the four-block zone of the Upper West Side now displayed on the device because the user's speech and actions have laid down a trail of contextual traces that lead to the Upper West Side as the grounded location, for at least the duration of that particular interaction. However, a system that solely uses GPS to establish the location of the device for a query would fail that simple test of human understanding, and would instead display restaurants in the user's immediate vicinity of the Lower East Side—probably undoing the user's map navigation actions in the process, and losing the established context of interaction.

Queries handled by Speak4it and other similar applications typically cover descriptions of categories or names of businesses and, as a result, the queries it receives tend to be short and not grammatically complex. Thus, when a user makes an effort to speak the name of a location in a query, it is safe to assume that the uttered location is salient to that person for that query. For the majority of cases, however, people do not explicitly state a location, revealing a need for some mechanism to determine the intended location.

The embodiments presented herein address the aforementioned deficiencies in establishing the grounded location—that is, the location a person believes has been established as mutually salient with a search system when issuing a search request—from the many possible locations that could also be relevant.

SUMMARY

The embodiments disclosed herein address the aforementioned limitations of Speak4it and other contemporary search systems, and further address the challenge of location grounding. In one embodiment, true multimodal commands are supported such that a user can combine speech and touch, for example, by saying, "Chinese restaurants near here" while touching or circling a location on the map. In another embodiment, an initial location grounding algorithm provides a more flexible determination of the grounded location than using only the physical device location. In yet another embodiment, a multimodal disambiguation mechanism is used to enable capture of users' intentions with regard to the locations they believed had been grounded when they issued their queries.

According to one exemplary embodiment, a method for multimodal search includes receiving, at a multimodal search system, a query information package from a remote mobile device. In one embodiment, the query information package includes a search query text string including a search topic component and a location component. The location component may be populated with precise location information, ambiguous location information, or, in some instances, no location information. The query information package, in one embodiment, further includes map state information including boundary information of a map displayed on the remote mobile device and a zoom level of the map when the search query text string was issued, touch input information when the search query text string was issued, and/or prior query location information. The method further includes parsing, at the multimodal search system, the search query text string into the search topic component and the location component.

The method further includes determining the type of location information, if any, that is included in the location component. If the location component includes ambiguous location information or no location information, the method further includes determining, at the multimodal search system, a search location in which the multimodal search system should search for the search topic component. The search location may be defined by the map state information when the search query text string was issued, the touch input information when the search query text string was issued, or the prior query location information. The method further includes determining, at the multimodal search system, a first set of search results based upon the search location and the search topic component, and sending the first set of search results to the remote mobile device.

If the location component includes precise location information, the method further includes determining, at the multimodal search system, a second set of search results based upon the precise location information, and sending the second set of search results to the remote mobile device.

In one embodiment, the search query text string is received by the multimodal search system text, speech audio, or a combination thereof.

In one embodiment, the query information package further includes information related to a map manipulation that occurred before the search query text string was issued, a time since the map manipulation occurred, and a geographic location of the remote mobile device when the search query text string was issued. In this embodiment, the method further includes determining, at the multimodal search system, the search location in which the multimodal search system should search for the search topic component based further upon the map manipulation, the time since the map manipulation, and/or the geographic location of the remote mobile device when the search query text string was issued.

In one embodiment, the method further includes determining, at the multimodal search system, the search location in which the multimodal search system should search for the search topic component at least partially based upon a machine learning model trained prior to the multimodal search system receiving the query information package.

In one embodiment, the method further includes, as part of training the machine learning model, receiving, at the multimodal search system, a plurality of training query information packages from at least one training remote mobile device. Each training query information package includes a training search query text string that includes a training search topic component and a training location component. The training location includes training ambiguous location information or no training location information. Each training query information package also includes training map state information, training touch input information, training prior query location information, training map manipulation information, and/or training geographic location information. The method further includes instructing at least some training remote mobile devices from which at least one of the plurality of training query information packages is received to provide a disambiguation interface configured to request an intended location of the training location component via a plurality of selectable options to the training remote mobile devices. The selectable options, in one embodiment, include a current location, a currently displayed location, a last spoken location, and a last touched location. The method further includes receiving, at the multimodal search system, the intended location from the at least some training remote mobile devices from which at least one of the plurality of training query information packages is received as one of the current location, the currently displayed location, the last spoken location, and the last touched location. The method further includes storing the intended locations in combination with the training map state information, the training touch input information, the training prior query location information, the training map manipulation information, and the training geographic location information, if available, to create a machine learning instance for each of the intended locations, and training the machine learning model using the machine learning instances. Alternative machine learning models and methods for training the machine learning models are contemplated.

In one embodiment, the steps used to create the machine learning instances described above are performed until a threshold value of machine learning instances is at least reached.

According to another exemplary embodiment, a non-transitory computer-readable medium includes computer-executable instructions that, when executed by a processor, cause the processor to perform any aforementioned method.

According to yet another exemplary embodiment, a multimodal search system includes a communications interface, a processor, and a memory. The memory is configured to store instructions that, when executed by the processor, cause the processor perform any aforementioned method.

BRIEF DESCRIPTION OF THE DRAWINGS

FIG. 1 schematically illustrates an exemplary network in which various embodiments disclosed herein may be implemented.

FIGS. 2A-F each schematically illustrates an embodiment of a graphical user interface (GUI) of a multimodal search application.

DETAILED DESCRIPTION

Figure 3:
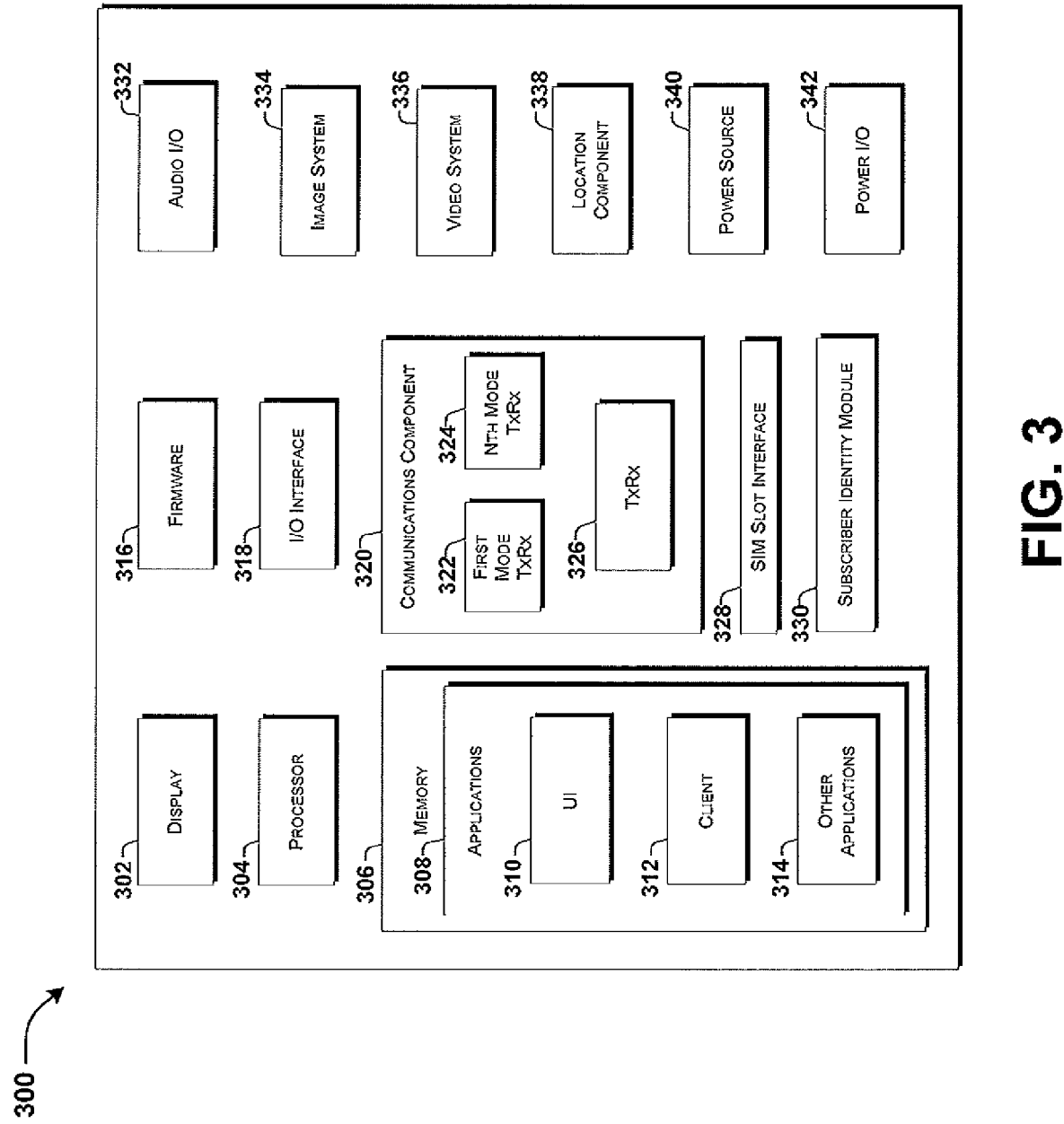
FIG. 3 schematically illustrates an embodiment of a mobile communications device and components thereof.

As required, detailed embodiments are disclosed herein. It must be understood that the disclosed embodiments are merely exemplary examples that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials, or methods have not been described in detail in order to avoid obscuring the embodiments disclosed herein. Therefore, specific structural and functional details disclosed herein are not to be interpreted as limiting, but merely as a basis for the claims and as a representative basis for teaching one skilled in the art to variously employ the disclosed embodiments.

While the processes or methods described herein may, at times, be described in a general context of computer-executable instructions, the present methods, procedures, and processes can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network nodes, single or multiple processor computers, hand-held computing devices, mobile communications devices, microprocessor-based consumer electronics, programmable electronics, network elements, gateways, network functions, devices, combinations thereof, and the like.

Exemplary Network

Referring now to the drawings in which like numerals represent like elements throughout the several figures, FIG. 1 schematically illustrates an exemplary network 100, according to one exemplary embodiment. The network 100 includes a location 102 in which a user 104 is located. As used herein, the term "user" may refer to a person that subscribes to wireless service provided by a wireless carrier in accordance with a postpaid subscription plan or a pre-paid plan.

The user 104 is associated with a mobile communications device (MD) 106 through which the user communicates with a wireless communications network 108 to carry out voice and/or data communications with other users within or outside the location 102, and to conduct, in accordance with the embodiments described herein, multimodal search queries from a multimodal search client application 109 (hereinafter, referred to as the multimodal search application (MSA) or the multimodal search client application (MSCA)) stored on the MD 106.

The systems, devices, methods, and computer program products described herein may be implemented in wireless networks, such as the illustrated wireless communications network 108, that use telecommunications standards such as Global System for Mobile communications (GSM) and a Universal Mobile Telecommunications System (UMTS). It should be understood, however, alternatively or additionally, the systems, devices, methods, and computer program products may be implemented in wireless networks that use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSDPA), Evolved HSPA (HSPA+), and various other current and future data bearers.

The user 104 interacts with the MSA 109 to conduct searches for search topics such as specific locations, streets, neighborhoods, towns, cities, counties, states, countries, landmarks, businesses, monuments, parks, amusement parks, sports venues, and the like. The search topics are included in a search query information package that is packaged and sent by the MD 106 to a multimodal search system (MSS) 110 via the wireless communications network 108 as a hypertext transfer protocol (HTTP) data stream, a secure HTTP (HTTPS) data stream, or otherwise packetized for delivery to the MSS 110 via another protocol, such as others known by those skilled in the art. A search query information package as used herein broadly refers to a collection of data associated with a search query.

In one embodiment, the user 104 enters a search topic (e.g., into a pre-defined text box provided by the MSA 109) using text, for example, via a hardware and/or software keyboard. In another embodiment, the user 104 speaks a search topic and the MSA 109 captures and encodes the speech for delivery to the MSS 110 via the wireless communications network 108 as speech for conversion to text by the multimodal search system 110 or an external system, such as one or more of the illustrated external systems 112, 114, 116. Alternatively, the MSA 109 or another application, such as a dedicated speech-to-text application, stored on the MD 106 converts the speech into text and the MSA 109 directs the MD 106 to send the transformed speech to the MSS 110. The MD 106 may, in another embodiment, send the speech to a remote speech-to-text application (not shown) and receive, in response, the transformed speech for sending to the MSS 110. The MD 106 may alternatively instruct the remote speech-to-text application to send the transformed speech to the MSS 110. The remote speech-to-text application may be stored on one of the external systems 112, 114, 116 (which may be in communication with the MD 106 via the wireless communications network 108 without first going through the MSS 110) or may be stored on another system that is in communication with the wireless communications network 108. An exemplary MD 300 such as the MD 106 is described in greater detail below with reference to FIG. 3.

The MSS 110, in some embodiments, is configured to perform one or more of speech recognition, gesture recognition, query parsing, geocoding, search, grounded location modeling, and other functions. These functions may be carried out by specific components (e.g., hardware and/or software) of the MSS 110, as described in greater detail with reference to FIG. 4, or, alternatively, by one or more of the illustrated external systems/modules 112, 114, 116 that are each in communication with the MSS 110.

Multimodal Search Application Graphical User Interface

Referring now to FIG. 2, various embodiments of a graphical user interface (GUI) 200 of the MSA 109 are illustrated. The GUI 200 changes based upon various manipulations and inputs received by the MD 106 through user interaction and/or data received via communications the MD 106 has with the MSS 110 and/or other systems via the wireless communications network 108.

FIG. 2A particularly illustrates the GUI 200 including a map 202. The map 202 can be manipulated by a user interaction with a touch screen of the MD 106 or other control interface, such as hardware buttons, keyboards, keypads, etc. In one embodiment, the MD 106 supports multi-touch gestures such a pinch-to-zoom for zoom control and drag gestures for pan control to position the map 202 so as to allow a user to isolate a particular portion of the map 202 in which the user is interested. Other touch and multi-touch gestures are contemplated for user interaction with the map 202 and other aspects of the MSA 109 described herein.

In FIG. 2A, the GUI 200 also includes a text input box 204 in which a user can enter a search topic via speech or text entry, as described above. In some embodiments, such as illustrated, speech entry is prompted by pressing a speak/draw software button 206. The speak/draw software button 206 also allows a user to draw on the map 202 to indicate a search location, as described in greater detail with reference to FIGS. 2D-2F. When the user presses the speak/draw button 206, touch gestures on the map 202 are interpreted as referential pointing and drawing actions rather than direct map manipulation. After the user makes a gesture, clicks stop, or stops speaking, the map 202 ceases to work as a drawing canvas and returns to a direct map manipulation mode. The user's "ink" gesture points are sent over HTTP or some other protocol along with, in one embodiment, their encoded speech input to the MSS 110. This data stream also contains additional information used for location grounding and search, such as, in one embodiment, current GPS coordinates of the MD 106 and/or a history of recent movements of the map 202 display and utterances spoken.

In FIG. 2B, the GUI 200, in addition to the features illustrated and described with reference to FIG. 2A, includes a highlighted search result 208. The highlighted search result 208 may be highlighted as illustrated (i.e., including a "more information" user interface (UI) guide) or otherwise distinguished from the other search results illustrated as drop pins. Color, size, opacity, and other like design considerations may be used to distinguish the highlighted search result 208 from the other search results. Moreover, the highlighted search result 208 may be highlighted upon user selection or automatically at a time after the search results are retrieved.

In FIG. 2C, the GUI 200 replaces the map 202 and the highlighted search result of FIG. 2B in favor of a search results list 210. This option may be a preferred option set by the user, application developer, carrier, device OEM, or the like such that search results are always presented in a list format as opposed to the mapped search results illustrated in FIG. 2B. Alternatively, a toggle option may be provided so that the user can toggle between the two views. Other organizations, views (e.g., radar view, augmented reality view, street view, satellite view, and the like), and other design considerations including fonts, font size, colors, bold, italics, underline, etc. are contemplated. As illustrated, the search results list 210 also shows a highlighted search result 212 and distance from the MD's 106 current location or other location entered into the MSA 109. Directions from that location may also be provided as additional functionality within the MSA 109 or from a separate application stored on the MD 106 or a remote application (e.g., a web application) to which the MSA 109 links upon receiving user selection of a directions option (not illustrated).

Turning now to FIG. 2D, the GUI 200 includes the map 202 and a map boundary 214 that is defined, for example, by the user via touch interaction and/or other user input such as speech input of the user speaking a particular location in which the map 202 would auto-zoom to the spoken location, for example. In one embodiment, boundary information defining the boundary 214 is provided with the query information package to the MSS 110 for consideration by the MSS 110 in determining the intended location of a user when submitting a particular search query that either lacks location information or includes ambiguous location information, as described in greater detail herein, for example, with reference to FIGS. 5 and 6.

Also illustrated in FIG. 2D is speech input visualization bar 216 that provides visual feedback to a user of a received volume of the user's speech input. The user can monitor the speech input visualization bar 216 when speaking for an indication of whether his or her speech is too quiet or too loud and make the necessary adjustments. The design of the speech input visualization bar 216 may, like other design considerations, be changed to accommodate certain operating system aesthetics, application aesthetics, or other desired UI distinctions or themes. In some embodiments, the speech input visualization bar 216 is not provided at all, optional per user preference, or temporarily shown (e.g., only when input is detected by a microphone of the MD 106 or on some other temporal basis). The GUI 200 also includes a stop soft button 218 by which the user can manually stop speech recording. Alternatively, in some embodiments, speech recording is stopped automatically after pre-defined time elapses in which no speech input is received or via a manual hardware button press.

In addition to unimodal spoken commands for search and map manipulation, the MSA 109 also supports multimodal commands where the location is specified directly by drawing on the map 202. In one embodiment, the MSA 109 supports one or more of a point gesture 220 (FIG. 2D), an area gesture 222 (FIG. 2E), and a line gesture 224 (FIG. 2F). For example, the user can say, "French restaurants here" in conjunction with a point or area gesture. For the point gesture, the MSA 109 returns (e.g., after querying the MSS 110) French restaurants closest to the point. For an area gesture, results within the area are returned. For a line gesture, results closest to the line are returned. Line gestures may also be used to trace a route on the map 202. For example, the user might say "gas stations" and trace a route (FIG. 2F) on the map 202. The MSA 109 will show the gas stations along that route.

Exemplary Mobile Communications Device

Referring now to FIG. 3, a schematic block diagram of an exemplary mobile communications device (MD) 300 and components thereof is illustrated. Although connections are not shown between the components illustrated in FIG. 3, the components can interact with each other to carry out device functions. In some embodiments, for example, the components are arranged so as to communicate via one or more busses (not shown). It should be understood that FIG. 3 and the following description are intended to provide a general understanding of a suitable environment in which various aspects of the disclosed embodiments can be implemented.

In some embodiments, the MD 106 illustrated in FIG. 1 is configured like the illustrated MD 300, now described. In some embodiments, the MD 300 is a multimode headset configured to provide access to more than one network types including, for example, the telecommunications technologies described above and/or other technologies such as Wi-Fi™ and WIMAX™.

In some embodiments, the MD 300 includes computer-readable media, including, for example, volatile media, non-volatile media, removable media, and non-removable media. The term "computer-readable media" and variants thereof, as used herein with respect to the MD 300, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD-ROM, DVD, or other optical disk-based storage, magnetic tape, magnetic disk storage or other magnetic storage devices, or any other tangible, non-transitory medium that can be used to store the desired information and that can be accessed by the MD 300.

As illustrated in FIG. 3, the MD 300 includes a display 302 for presenting multimedia such as, for example, short messaging system (SMS) messages, enhanced messaging service (EMS), multimedia messaging service (MMS) messages, customer service messages, over-the-air (OTA) messages, unstructured supplementary service data (USSD) messages, voicemail notification messages, application graphical user interfaces (GUIs), text, images, video, telephony functions, such as Caller ID data, setup functions, menus, music, metadata, wallpaper, graphics, Internet content, multicast content, broadcast content, social networking content, game content, device status, preferences settings, map and location data, search information, profile (e.g., vibrate, silent, loud) selection, and the like.

The illustrated MD 300 also includes a processor 304 for processing data and/or executing computer-executable instructions of one or more applications 308 stored in a memory 306. In some embodiments, the application(s) 306 include a user interface (UI) application 310. The UI application 310 interfaces with a client 312 (e.g., an operating system (OS)) to facilitate user interaction with device functionality and data. In some embodiments, the client 312 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Microsoft® Windows® Phone OS, Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iOS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems or versions of the aforementioned operating systems are contemplated.

The UI application 310 aids a user in activating service OTA, if applicable, entering message content, viewing received messages (e.g., MMS messages, SMS messages, USSD messages, OTA messages), answering/initiating calls, entering/deleting data, entering and setting user IDs and passwords for device access, configuring settings, manipulating address book content and/or settings, multimode interaction, interacting with other applications 314, and the like.

In one embodiment, the other applications 314 include a multimodal search client application, such as the MSA 109 illustrated and described above with reference to FIGS. 1 and 2A-2F. In some embodiments, the other applications 314 also include, for example, visual voicemail applications, messaging applications (e.g., SMS, EMS, and MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 308 are stored in the memory 306 and/or as a firmware 316, and are executed by the processor 304. The firmware 316 may also store code for execution during device power up and power down operations.

The MD 300 also includes an input/output (I/O) interface 318 for input/output of data such as femtocell access IDs, location information, presence status information, user IDs, passwords, and application initiation (start-up) requests. In some embodiments, the I/O interface 318 is a hardwire connection such as a USB, mini-USB, audio jack, PS2, IEEE 1394, serial, parallel, Ethernet (RJ48) port, RJ11 port, and the like. In some embodiments, the I/O interface 318 is a proprietary interface. In some embodiments, the I/O interface 318 accepts other I/O devices such as keyboards, keypads, mice, interface tethers, stylus pens, printers, solid state memory drives, touch screens, multi-touch screens, touch pads, trackballs, joysticks, directional pads, analog control sticks, microphones, remote control devices, monitors, displays (e.g., liquid crystal displays (LCDs), light emitting diode (LED) backlight LCD, and organic LED OLED) combinations thereof, and the like. It should be appreciated that the I/O interface 318 may be used for communications between the MD 300 and a network device or local device, instead of, or in addition to, a communications component 320.

The communications component 320 interfaces with the processor 304 to facilitate wired/wireless communications with external systems. Example external systems include, but are not limited to, SMS service centers (SMSCs), intranets, network databases, network storage systems, cellular networks (e.g., the wireless communications network 108), location servers, presence servers, VoIP networks, local area networks (LANs), wide area networks (WANs), metropolitan area networks (MANs), personal area networks (PANs), and other networks, network components, and systems described herein. In some embodiments, the external systems are implemented using Wi-Fi™, WiMAX™, combinations and/or improvements thereof, and the like. In some embodiments, the communications component 320 includes a multimode communications subsystem for providing cellular communications via different cellular technologies. In some embodiments, for example, a first cellular transceiver 322 operates in one mode, such as, GSM, and an Nth cellular transceiver 324 operates in a different mode, such as UMTS or LTE. While only two cellular transceivers 322, 324 are illustrated, it should be appreciated that a plurality of transceivers can be included. Moreover, a portion of or the entirety of the communications component 320 may be provided as an add-on to the MD 300. The add-on may attach or wirelessly communicate with the MD 300 via the I/O interface 318 using a standardized or proprietary communication specification.

The illustrated communications component 320 also includes an alternative communications transceiver 326 for use by other communications technologies such as, for example, Wi-Fi™, Wi-Max™, BLUETOOTH, infrared, infrared data association (IRDA), near field communications (NFC), RF, and the like. In some embodiments, the communications component 320 also facilitates reception from terrestrial radio networks, digital satellite radio networks, Internet-based radio services networks, combinations thereof, and the like.

The MD 300 also includes a SIM slot interface 328 for accommodating a SIM 330 such as a SIM card, a universal SIM (USIM) card, or a universal integrated circuit card (UICC) including one or more SIM applications (e.g., ISIM, SIM, USIM, CSIM).

Audio capabilities for the MD 300 may be provided by an audio I/O component 332 that includes a speaker for the output of audio signals and a microphone to collect audio signals.

The MD 300 may also include an image capture and processing system 334 (image system). Photos may be obtained via an associated image capture subsystem of the image system 334, for example, a charge-coupled device (CCD) or active pixel sensor (APS) camera. The MD 300 may also include a video system 336 for capturing, processing, recording, modifying, and/or transmitting video content. Photos and videos obtained using the image system 334 and the video system 336, respectively, may be added as message content to an MMS message and sent to another mobile device.

The MD 300 also includes a location component 338 for sending and/or receiving signals such as, for example, GPS data, assisted GPS (A-GPS) data, Wi-Fi™/Wi-Max™, and/or cellular network triangulation data, combinations thereof, and the like, for determining a location of the MD 300. The location component 338 may communicate with the communications component 320 to retrieve triangulation data for determining a location. In some embodiments, the location component 338 interfaces with cellular network nodes, telephone lines, satellites, location transmitters and/or beacons, wireless network transmitters and receivers, for example, Wi-Fi™ hotspots, radio transmitters, combinations thereof, and the like. Using the location component 338, the MD 300 obtains, generates, and/or receives data to identify its location, or transmits data used by other devices to determine the location of the MD 300.

The MD 300 also includes a power source 340, such as batteries and/or other power subsystem (AC or DC). The power source 340 may interface with an external power system or charging equipment via a power I/O component 342

Exemplary Multimodal Search System

Figure 4:
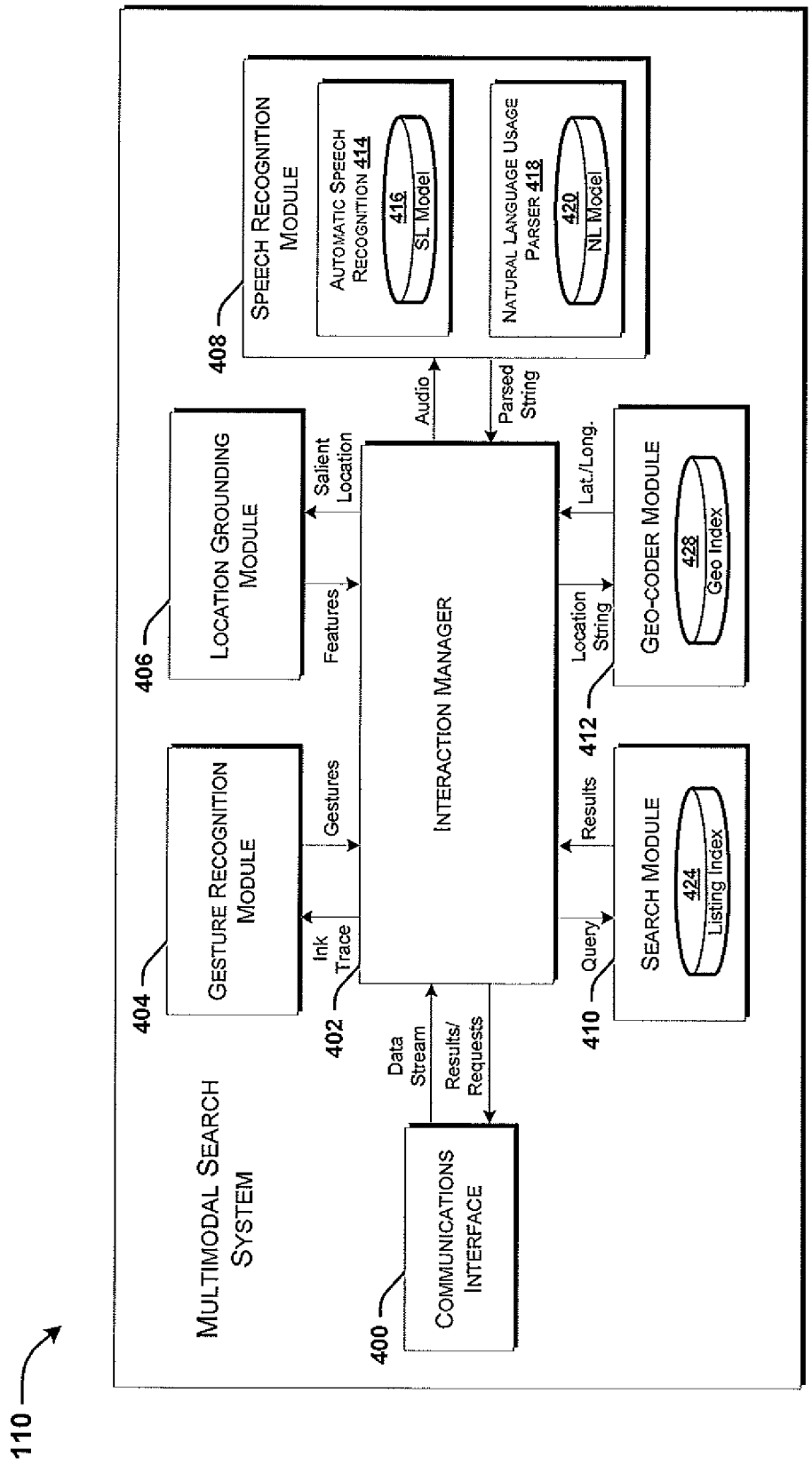
FIG. 4 schematically illustrates an embodiment of a multimodal search system and components thereof.

Referring now to FIG. 4, the MSS 110 and exemplary components thereof are illustrated. As described above, the user 104 interacts with the MSA 109 on the MD 106 which communicates over HTTP or other protocol with the MSS 110 that performs, in one embodiment, speech recognition, gesture recognition, query parsing, geocoding, search, and/or grounded location modeling, among other functions described herein.

The illustrated MSS 110 includes a communications interface 400 by which the MSS 110 receives data from the MD 106, such as query information packages, and returns search results and/or requests for additional input. The communications interface 400 is in communication with an interaction manager 402. The interaction manager 402 communicates with a gesture recognition module 404, a location grounding module 406, a speech recognition module 408, a search module 410, and a geo-coder module 412 to carryout gesture recognition functions, location grounding functions, speech recognition functions, search functions, and geo-coder functions, as described in greater detail below. The interaction manager 402 and the various modules 404, 406, 408, 410, 412, in one embodiment, are software modules (e.g., applications or parts of applications) that are stored in a memory and executed by the MSS 110 (e.g., by a processor of the MSS 110) to perform acts such as those described in the methods disclosed herein below with reference to FIGS. 5-8. As such, the modules may include computer-executable instructions that are stored on a non-transitory computer-readable medium such as a local (i.e., part of the MSS 110) or remote hard disc drive or solid state drive (SSD), or a removable non-transitory computer-readable medium such as a removable SSD drive (e.g., a USB flash drive) or a disc-based media.

In another embodiment, the interaction manager 402 and the various modules 404, 406, 408, 410, 412 are individual hardware/software components each of which capable of performing discrete functions such as those described below as being particular to each specific component. In yet another embodiment, one or more of the interaction manager 402 and the various modules 404, 406, 408, 410, 412 are combined hardware/software components for performing functions of the combined components. In still another embodiment, the MSS 110 includes only the interaction manager 402 and the functions of the various modules 404, 406, 408, 410, 412 are performed by the modules as part of one or more of the external systems 112, 114, 116 of FIG. 1.

A multimodal data stream includes a search query information package is received by the communications interface and sent to the interaction manager 402, which manages routing of particular contents of the query information package to the various modules. The search query information package, in one embodiment, includes a search query text string including a search topic component and a location component. The location component may be populated with precise location information, ambiguous location information, or, in some instances, no location information. The query information package, in one embodiment, further includes map state information including boundary information of a map displayed on the remote mobile device (e.g., the MD 106) that submitted the search query and a zoom level of the map when the search query text string was issued, touch input information (e.g., ink trace) when the search query text string was issued, and/or prior query location information. In some embodiments, the query information package further includes information related to a map manipulation that occurred before the search query text string was issued, a time since the map manipulation occurred, and a geographic location of the remote mobile device when the search query text string was issued.

The interaction manager 402 passes the user's ink trace to the gesture recognition module 404, which uses a classifier based on, for example, a known gesture recognizer to classify the input as point, line, or area. If the search query information package includes speech data (e.g., if the speech is not transformed to text by the MD 106 or another system prior to reaching the MSS 110), the audio stream is forwarded to the speech recognition module 408, which, in one embodiment, performs automatic speech recognition via an automatic speech recognition (ASR) application 414 using a statistical language model (SL model) 416 trained on previous query data. From here, the speech recognition output, in one embodiment, is passed to a natural language usage (NLU) parser application 418 that parses the query into a topic phrase using a natural language model 420 that designates the user's desired search subject (e.g., "pizza") and, if applicable, a location phrase (e.g., "San Francisco") that designates a desired location.

In cases where there is an explicit location phrase—like "pizza restaurants in San Francisco"—the location phrase is geo-coded using a geo index 428 of the geo-coder module 412 so search results from the topic phrase may be sorted and displayed according to their proximity to that location. If the location is not stated explicitly in the query, the interaction manager 402 can pass a series of features that pertain to possible salient locations in the current interaction to the location grounding module 406, which uses those features as input to attempt to determine the current grounded location. Listing data is stored in a listing index 424 of the search module 410. The interaction manager 402 queries the search module 410 for listing data associated with the search topic and location.

The interaction manager 402 is also responsible for making decisions regarding explicit disambiguation requests made to the user, as when, for example, there are several possible locations named "Springfield" and the user has not specified which was intended. These options for disambiguation are passed to the MSA 109 and, in one embodiment, overlaid on the map for the user to select one. This mechanism also underlies the disambiguation method described herein below. An exemplary disambiguation interface is illustrated and described with reference to FIG. 9. In one embodiment, the information passed throughout the MSS 110 is written to logs that can be analyzed for behavioral trends. In one embodiment, audio recordings of one or more user queries are manually transcribed for evaluation.

Exemplary Methods

It should be understood that the steps of the following methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated methods can be ended at any time. In certain embodiments, some or all steps of these methods, and/or substantially equivalent steps can be performed by execution of computer-readable instructions stored or included on a non-transitory computer-readable medium of the above-described MSS 110 or otherwise executed by the MSS 110, as in the described embodiments. Alternatively, some or all steps of these methods, and/or substantially equivalent steps can be performed by execution of computer-readable instructions stored or included on a non-transitory computer-readable medium of one or more of the external systems/modules 112, 114, 116.

Figure 5:
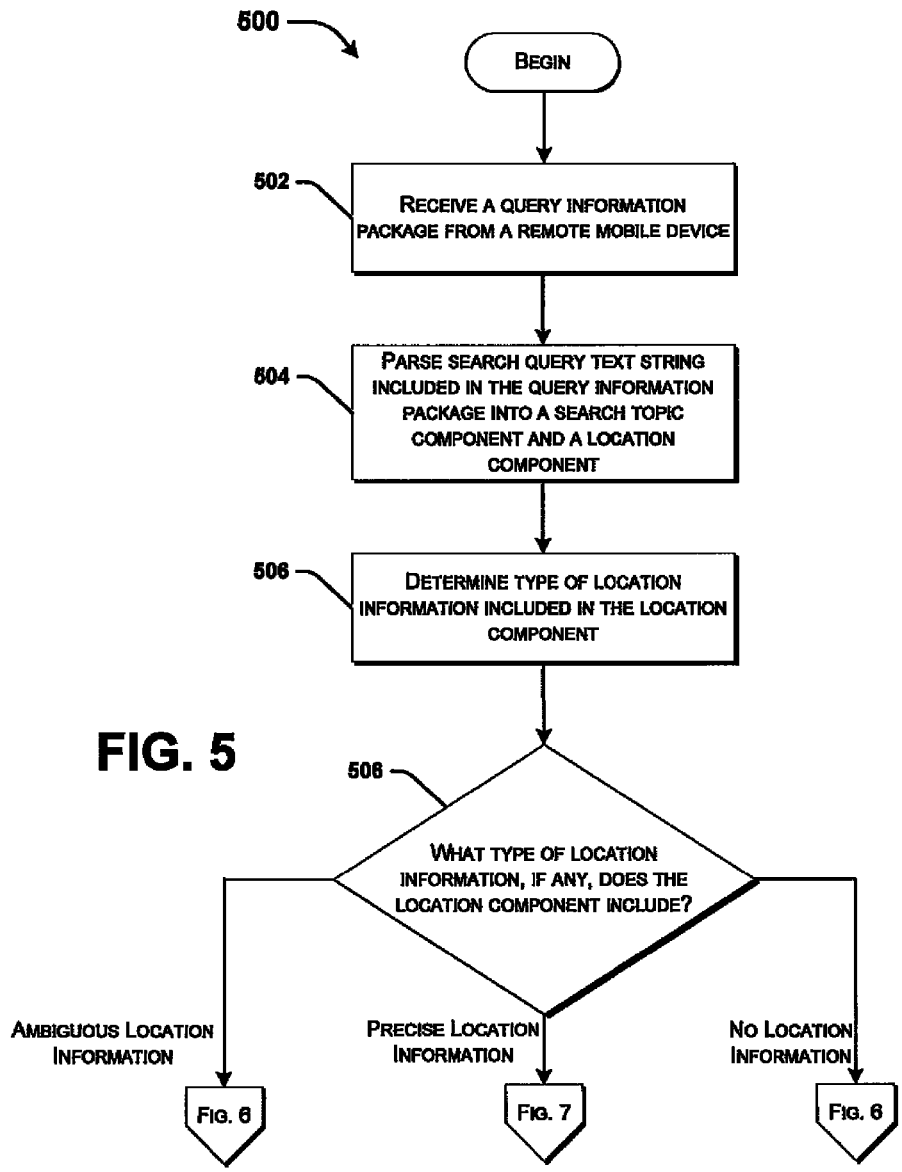
FIG. 5 illustrates an embodiment of a method for multimodal search.

Referring now to FIG. 5, an embodiment of a method 500 for multimodal search is illustrated. The method 500 begins and flow is to block 502 whereat the MSS 110 receives a query information package from a remote mobile device such as the MD 106. The query information package includes a search query string including a search topic component and a location component. The search topic component includes a text or speech query of a location, entity, or other topic for which a user desires to search. The location component can include precise location information, ambiguous location information, or no location information. In addition to the search query string, the query information package includes map state information including boundary information defining the boundaries of a map displayed on the remote mobile device and a zoom level of the map when the search query string was issued. The query information package also includes touch input information (i.e., ink trace) of when the search query text string was issued. The query information package may also include location information for one or more prior search queries issued by the remote mobile device.

After receiving the query information package, the MSS 110 parses, at block 504, the search query text string included in the query information package into the search topic component and the location component. At block 506, the multimodal search system 110 determines the type (i.e., precise location information, ambiguous location information, or no location information) of location information included in the location component. At block 506, the method 500 proceeds to either FIG. 6, if no location information or ambiguous location information is included in the search query string, or FIG. 7, if precise location information is included in the search query string.

Figure 6:
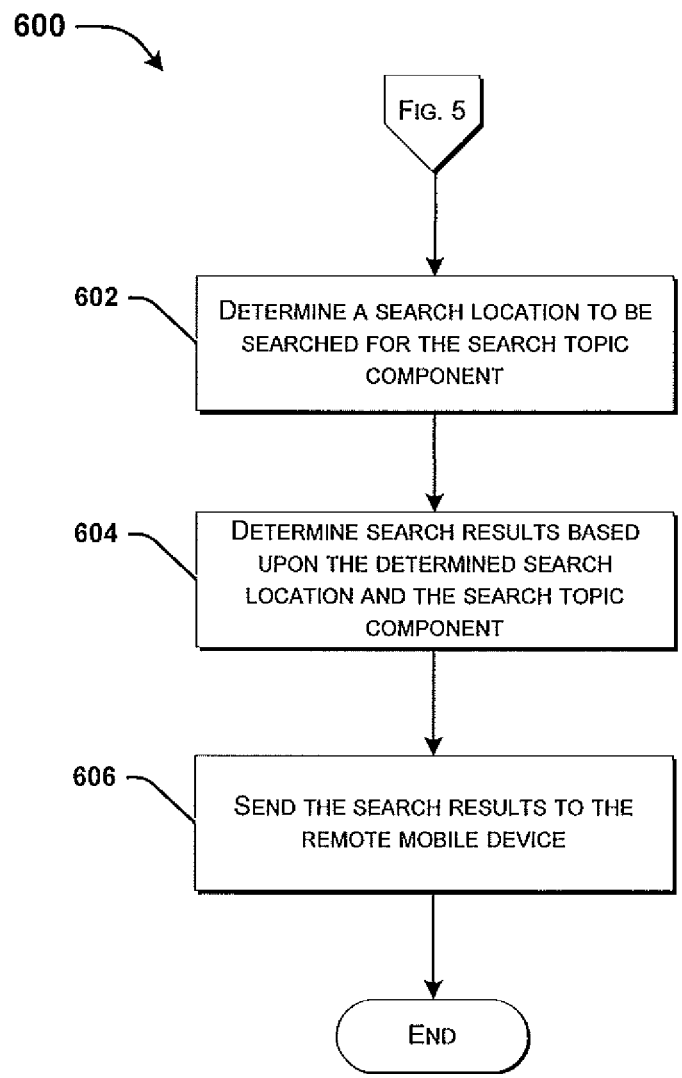
FIG. 6 illustrates an embodiment of an extension of the method for multimodal search of FIG. 5.

If the search query string includes either ambiguous location information or no location information, the method 600 of FIG. 6 begins and flow is to block 602 whereat the MSS 110 determines a search location to be searched for the search topic identified in the search topic component. In one embodiment, the search location determined by the multimodal search system 110 is defined by the map state information when the search query text string was issued. For example, the viewable area of the map displayed on the remote mobile device as defined by the boundaries and zoom level of the map. In another embodiment, the search location is defined by the touch input information when the search query text string was issued. For example, point, area, and/or line, or other location defined through touch input (e.g., drawing) by the user. In yet another embodiment, the search location is defined by a location of a previous query. For example, the user may issue a query with precise location information and a subsequent query with no or ambiguous location information. In such instances, the MSS 110 can utilize the precise location information received in the previous query.

At block 604, the MSS 110 determines search results based upon the search location determined at block 602 and the search topic component. At block 606, the MSS 110 sends the search results to the remote mobile device. The method 600 can end.

Figure 7:
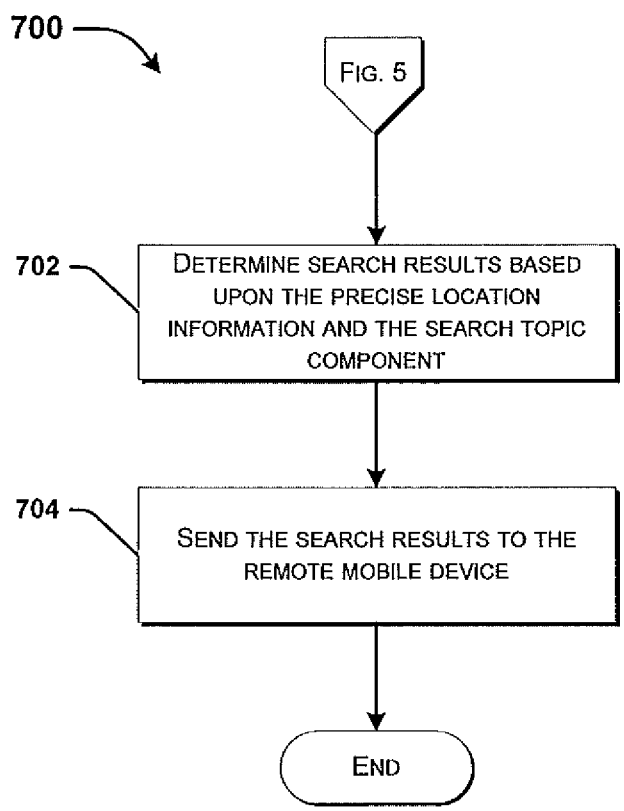
FIG. 7 illustrates another embodiment of an extension of the method for multimodal search of FIG. 5.

If the search query string includes either precise location information, the method 700 of FIG. 7 begins and flow is to block 702 whereat the MSS 110 determines search results based upon the precise location information and the search topic component. At block 704, the MSS 110 sends the search results to the remote mobile device. The method 700 can end.

Figure 8:
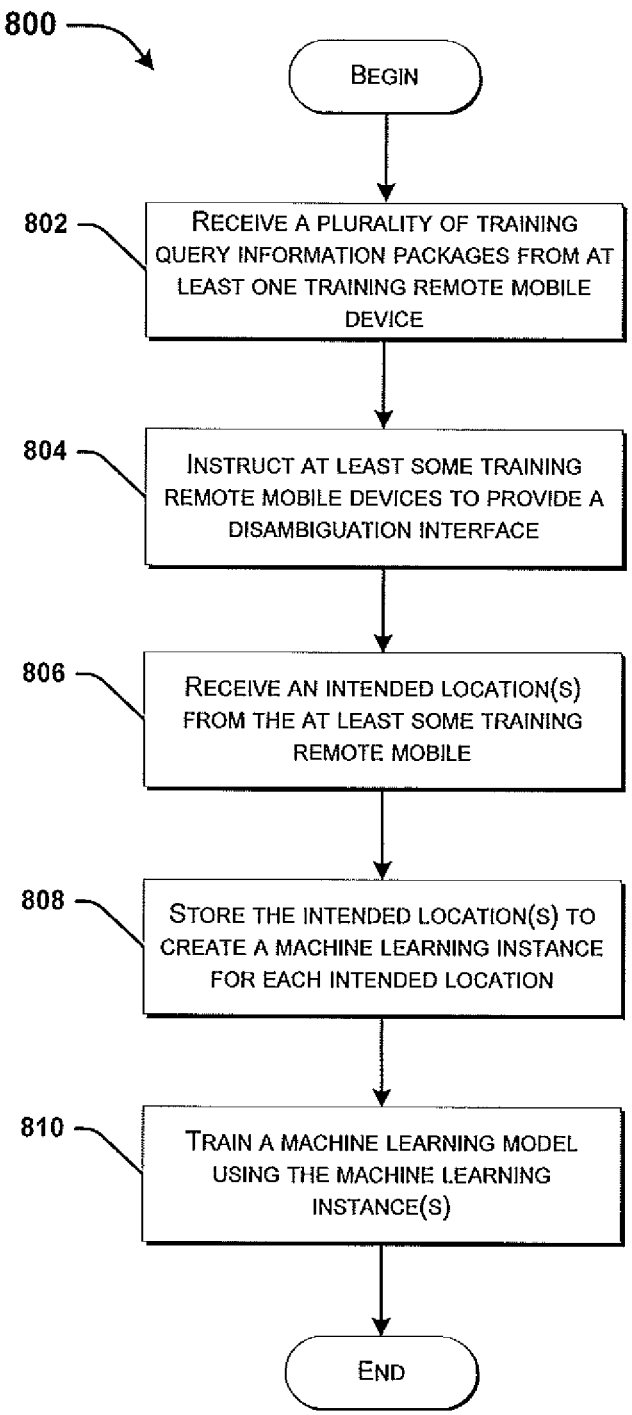
FIG. 8 illustrates an embodiment of a method for training an exemplary machine learning model.

Referring now to FIG. 8, a method 800 for training an exemplary machine learning model is illustrated. The machine learning model, in one embodiment, is a decision tree. Other machine learning models are contemplated. The method 800 begins and flow is to block 802 whereat the MSS 110 receives a plurality of training query information packages from at least one training remote mobile device. The training query information packages can include the same types of information included in the query information package, described above. Likewise, the training remote mobile devices may include the MD 106 and any number of additional or alternative devices from which the training information packages are received and used by the MSS 110 to train the exemplary machine learning model. In one embodiment, the MSS 110 does not explicitly notify users of the remote mobile devices that information shared with the MSS 110 is being used for training purposes. In another embodiment, the MSS 110 requests opt-in authentication prior to using information retrieved from a particular remote mobile device for training. In yet another embodiment, the remote mobile devices and the users interacting therewith are employed specifically for training purposes.

At block 804, the MSS 110 instructs at least some of the training remote mobile devices to provide a disambiguation interface to the device's respective users. An exemplary disambiguation interface is illustrated and described below with reference to FIG. 9.

At block 806, the MSS 110 receives an intended location from at least some of the training remote mobile devices. At block 808, the MSS 110 stores the intended location(s). In storing the intended locations and the search query text strings, the MSS 110 creates a machine learning instance for each intended location. At block 810, the MSS 110 trains a machine learning model using the machine learning instances. The method 800 can end.

Exemplary Disambiguation Interface

When a user does not explicitly indicate a location, there are at least four locations that may be salient in common ground: (1) the user's current location, (2) the location context displayed on the map, (3) the last location the user may have explicitly spoken, and (4) the last location the user touched on the map. Rather than making a guess about which of these locations the user has in mind, a disambiguation interface is used to gather ground-truth for the intended location. The disambiguation interface asks users which location context they meant. Following a query where a user did not speak or otherwise enter a location as part of the query, they would be prompted with a dialogue box that asked, for example, "Which location did you want to search for coffee shops in?" The disambiguation interface can include any number of selectable options each of which includes a possible response option, such as: "My current location"; "Area shown on map"; "The place I touched"; and "The last place I mentioned." A "None of the above" response option may also be presented, for example, in case the user's intentions did not match any of the other options.

In one embodiment, the response options are presented in an order that is randomized across users and queries to prevent bias arising from the locations of the buttons. The exception is the "None of the above" option, which may always be placed at the bottom. In addition, in some embodiments, only options that were relevant to the user's recent behavior are provided. Thus, for example, if a user had not touched the map and had not recently mentioned a location, they would see only two options (current location and map), not all of the example four.

In some embodiments, presentation of the disambiguation interface is on a "bucket-throttle" schedule, so users only see it during a fraction of the queries they issued. Moreover, this throttling may be varied so that only a small fraction of queries that do not contain an explicit location are presented with the disambiguation interface.

In one embodiment, for a random subset of queries received by the MSS 110 from users that did not contain an explicit location in the query, those requests are presented with the disambiguation interface before the user receives his or her search results and the user's subsequent indication of the intended location is recorded, along with all of the data that might relate to the user's query and its context. In order to maintain a cooperative search system, searches can be performed for each of the options presented in these requests, and can immediately display the results that corresponded to the user's choice. So if a user's query led to separate results for both the user's current location and the area shown on the map, the search module 410 can return sets of results for both searches, and the user's button selection would determine which of those results sets the MSA 109 subsequently displays.

For cases in which users did not receive the disambiguation interface, the MSS 110 can use an alternative approach to determine the intended location. In one embodiment, if the user gestured within the current turn, the location of the gesture may be assumed to be the most salient location for the user's search query. In another embodiment, four types of grounded locations are considered, each of which utilizes a fixed temporal threshold, combined with an overall rank preference order. The overall rank preference order, in one embodiment, is Touch>Map>Spoken>GPS. This embodiment is referred to the Threshold-Rank model.

In this model, the MSS 110 maintains a multimodal context model that stores the last location referent specified by the user for each mode of location reference (Touch, Spoken, Map, and GPS). Each mode is associated with a fixed temporal threshold, after which the location is removed from the mode. When a grounded location referent is needed, the MSS 110 checks the current state of the multimodal context model. If more than one location is available, a location is chosen based on the mode preference order rioted above. The temporal thresholds, in one embodiment, are set. In another embodiment, the temporal thresholds are continually adapted, according to usage data. Intuitively, thresholds for touch can be very short, while spoken location references are more persistent, and the map view location referent, which results from scrolling and panning actions, may lie somewhere between the two: not as ephemeral as touch, but not as persistent as speech.

Figure 9:
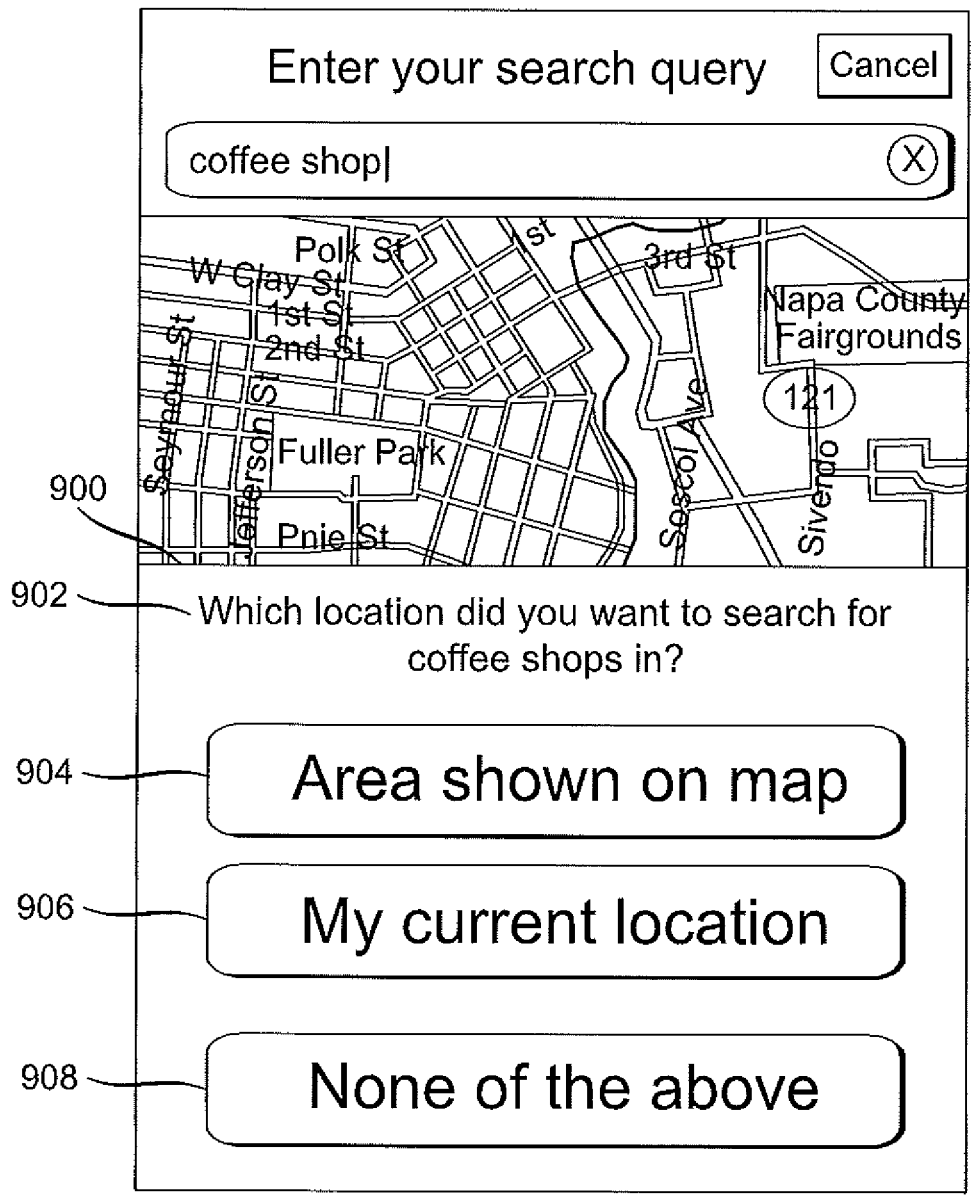
FIG. 9 illustrates an embodiment of an exemplary disambiguation interface of a multimodal search application.

Referring now to FIG. 9, an embodiment of an exemplary disambiguation interface 900 of a multimodal search application, such as the MSA 109 is illustrated. The disambiguation interface 900 includes a dialogue box 902 asking the user in which location the user intended to search for the search topic which, in the illustrated embodiment, is "coffee shops." The disambiguation interface 900 also includes a first response option 904 for "Area shown on map," a second response option 906 for "My current location," and a third response option 908 for "None of the above."

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for performing a multimodal search, comprising:
  receiving, by a multimodal search system having a processor, from a remote mobile device, a query information package comprising:
    (I) a search query text string comprising a search topic component and a location component, the location component comprising a type of information selected from a first group consisting of:
      (a) precise location information;
      (b) ambiguous location information; and
      (c) no location information;
    (II) map state information comprising boundary information of a map displayed on the remote mobile device when the search query text string was issued and zoom-level information indicating a zoom level of the map when the search query text string was issued;
    (III) touch tracing input information when the search query text string was issued;
    (IV) prior query location information, if available;
    (V) history of recent map movements information; and
    (VI) history of recent utterances information;
  determining which type of information, of the first group, the location component includes;
  if it is determined that the location component comprises one or both of (b) ambiguous location information and (c) no location information:
    determining, by the multimodal search system, based at least partially upon a decision tree model trained prior to the multimodal search system receiving the query information package, a search location in which the multimodal search system should search for the search topic component, including determining the search location to be one of a second group consisting of:
      a first specific location determined using (II) the map state information when the search query text string was issued;
      a second specific location determined using (III) the touch tracing input information when the search query text string was issued;
      a third specific location determined using (IV) the prior query location information;

a fourth specific location determined using (V) the history of recent map movements history information; and a fifth specific location determined using (VI) the history of recent utterances information;

determining, by the multimodal search system, a set of search results based upon the search location and the search topic component; and sending the set of search results to the remote mobile device;

training the decision tree model, comprising:

receiving, by the multimodal search system, a plurality of training query information packages from a training remote mobile device, each training query information package comprising:

a training search query text string comprising a training search topic component and a training location component, the training location component comprising one of training ambiguous location information and no training location information;

training map state information;

training touch tracing input information;

training prior query location information;

training map manipulation information; and training geographic location information;

instructing the training remote mobile device from which at least one of the plurality of training query information packages is received to provide a disambiguation interface configured to request an intended location of the training location component via a plurality of selectable options, the selectable options comprising a current location, a currently displayed location, a last spoken location, and a last touched location;

receiving, by the multimodal search system, the intended location from the training remote mobile device from which at least one of the plurality of training query information packages is received as one of the current location, the currently displayed location, the last spoken location, and the last touched location;

storing the intended locations in combination with the training map state information, the training touch tracing input information, the training prior query location information, the training map manipulation information, and the training geographic location information to create a decision tree instance for each of the intended locations;

training, using the decision tree instances, the decision tree model; and performing, until a threshold value of decision tree instances is at least reached, operations to create the decision tree instances.

2. The method of claim 1, wherein:

the set of search results is a first set of search results; and the method further comprises performing, in response to determining that the location component comprises (a) precise location information, operations comprising:

determining, by the multimodal search system, a second set of search results based upon the precise location information and the search topic component; and sending the second set of search results to the remote mobile device.

3. The method of claim 1, wherein:

the query information package further comprises (VII) information related to a map manipulation that occurred before the search query text string was issued and a time since the map manipulation occurred and (VIII) a geographic location of the remote mobile device when the search query text string was issued; and determining, by the multimodal search system, the search location in which the multimodal search system should search for the search topic component is further based upon at least one of (VII) and (VIII).

4. A non-transitory computer-readable storage medium comprising computer-executable instructions that, when executed by a processor, cause the processor to perform operations comprising:

receiving, from a remote mobile device, a query information package comprising:

(I) a search query text string comprising a search topic component and a location component, the location component comprising a type of information selected from a first group consisting of:

(a) precise location information;

(b) ambiguous location information; and (c) no location information;

(II) map state information comprising boundary information of a map displayed on the remote mobile device when the search query text string was issued and zoom-level information indicating a zoom level of the map when the search query text string was issued;

(III) touch tracing input information when the search query text string was issued;

(IV) prior query location information, if available;

(V) history of recent map movements information; and (VI) history of recent utterances information;

determining which type of information, of the first group, the location component includes;

if the processor determines that the location component comprises one or both of (b) ambiguous location information and (c) no location information:

determining, based at least partially upon a decision tree model trained prior to receiving the query information package, a search location in which to search for the search topic component, including determining the search location to be one of a second group consisting of:

a first specific location determined using (II) the map state information when the search query text string was issued;

a second specific location determined using (III) the touch tracing input information when the search query text string was issued;

a third specific location determined using (IV) the prior query location information;

a fourth specific location determined using (V) the history of recent map movements history information; and a fifth specific location determined using (VI) the history of recent utterances information;

determining a set of search results based upon the search location and the search topic component; and sending the set of search results to the remote mobile device;

training the decision tree model, comprising:

receiving a plurality of training query information packages from a training remote mobile device, each training query information package comprising:

a training search query text string comprising a training search topic component and a training location component, the training location component comprising one of training ambiguous location information and no training location information;
training map state information;
training touch tracing input information;
training prior query location information;
training map manipulation information; and
training geographic location information;
instructing the training remote mobile device from which at least one of the plurality of training query information packages is received to provide a disambiguation interface configured to request an intended location of the training location component via a plurality of selectable options, the selectable options comprising a current location, a currently displayed location, a last spoken location, and a last touched location;
receiving the intended location from the training remote mobile device from which at least one of the plurality of training query information packages is received as one of the current location, the currently displayed location, the last spoken location, and the last touched location;
storing the intended locations in combination with the training map state information, the training touch tracing input information, the training prior query location information, the training map manipulation information, and the training geographic location information to create a decision tree instance for each of the intended locations;
training, using the decision tree instances, the decision tree model; and
performing, until a threshold value of decision tree instances is at least reached, operations to create the decision tree instances.

5. The non-transitory computer-readable storage medium of claim 4, wherein:
the set of search results is a first set of search results; and
the operations further comprise, in response to determining that the location component comprises (a) the precise location information:
determining a second set of search results based upon the precise location information and the search topic component; and
sending the second set of search results to the remote mobile device.

6. The non-transitory computer-readable storage medium of claim 4, wherein:
the query information package further comprises (VII) information related to a map manipulation that occurred before the search query text string was issued and a time since the map manipulation occurred and (VIII) a geographic location of the remote mobile device when the search query text string was issued; and
the instructions that, when executed by the processor, cause the processor to determine the search location in which to search for the search topic component, cause the processor to determine the search location based upon at least one of (VII) and (VIII).

7. A multimodal search system comprising:
a processor; and
a memory, communicative with the processor, comprising computer-executable instructions that, when executed by the processor, cause the processor to perform operations comprising:
receiving, from a remote mobile device, a query information package comprising:
(I) a search query text string comprising a search topic component and a location component, the location component comprising a type of information selected from a first group consisting of:
(a) precise location information;
(b) ambiguous location information; and
(c) no location information;
(II) map state information comprising boundary information of a map displayed on the remote mobile device when the search query text string was issued and zoom-level information indicating a zoom level of the map when the search query text string was issued;
(III) touch tracing input information when the search query text string was issued;
(IV) prior query location information, if available;
(V) history of recent map movements information; and
(VI) history of recent utterances information;
determining which type of information, of the first group, the location component includes;
performing, if the processor determines that the location component comprises one or both of (b) ambiguous location information and (c) no location information, additional operations comprising:
determining, based at least partially upon a decision tree model trained prior to receiving the query information package, a search location in which the multimodal search system should search for the search topic component, including determining the search location to be one of a second group consisting of:
a first specific location determined using (II) the map state information when the search query text string was issued;
a second specific location determined using (III) the touch tracing input information when the search query text string was issued;
a third specific location determined using (IV) the prior query location information;
a fourth specific location determined using (V) the history of recent map movements history information; and
a fifth specific location determined using (VI) the history of recent utterances information;
determining a set of search results based upon the search location and the search topic component; and
sending, via a communications interface, the set of search results to the remote mobile device; training the decision tree model, comprising:
receiving a plurality of training query information packages from a training remote mobile device, each training query information package comprising:
a training search query text string comprising a training search topic component and a training location component, the training location component comprising one of training ambiguous location information and no training location information;
training map state information;
training touch tracing input information;
training prior query location information;
training map manipulation information; and
training geographic location information;
instructing the training remote mobile device from which at least one of the plurality training query information packages is received to provide a disambiguation interface configured to request an intended location of the training location component via a plurality of selectable options, the selectable options comprising a current location, a currently displayed location, a last spoken location, and a last touched location;

receiving the intended location from the training remote mobile device from which at least one of the plurality of training query information packages is received as one of the current location, the currently displayed location, the last spoken location, and the last touched location;

storing the intended locations in combination with the training map state information, the training touch tracing input information, the training prior query location information, the training map manipulation information, and the training geographic location information to create a decision tree instance for each of the intended locations;

training, using the decision tree instances, the decision tree model; and performing, until a threshold value of decision tree instances is at least reached, operations to create the decision tree instances.

8. The multimodal search system of claim 7, wherein:
the set of search results is a first set of search results; and
the operations further comprise performing, in response to determining that the location component comprises (a) the precise location information additional operations comprising:

determining a second set of search results based upon the precise location information and the search topic component; and sending the second set of search results to the remote mobile device.

9. The multimodal search system of claim 8, wherein:
the search query text string is received as speech audio or a combination of text and speech audio; and
the system further comprises a speech recognition module configured to receive the speech audio and convert the speech audio to text.

10. The multimodal search system of claim 8, further comprising a listings index comprising a plurality of listings from which the first set of search results and the second set of search results are determined.

11. The multimodal search system of claim 7, wherein:
the query information package further comprises (VII) information related to a map manipulation that occurred before the search query text string was issued and a time since the map manipulation occurred and (VIII) a geographic location of the remote mobile device when the search query text string was issued; and the instructions that, when executed by the processor, cause the processor to determine the search location in which the multimodal search system should search for the search topic component, cause the processor to determine the search location based upon at least one of (VII) and (VIII).

* * * * *